United States Patent
Sultenfuss et al.

(10) Patent No.: US 11,573,617 B2
(45) Date of Patent: Feb. 7, 2023

(54) INDICATOR FOR AC POWER ADAPTER

(71) Applicant: Dell Products, L.P., Round Rock, TX (US)

(72) Inventors: Andrew Thomas Sultenfuss, Leander, TX (US); Priyank Jatin Gajiwala, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 1037 days.

(21) Appl. No.: 16/258,331

(22) Filed: Jan. 25, 2019

(65) Prior Publication Data

US 2020/0241614 A1 Jul. 30, 2020

(51) Int. Cl.
*G06F 1/26* (2006.01)
*G06F 1/18* (2006.01)
(Continued)

(52) U.S. Cl.
CPC .............. *G06F 1/26* (2013.01); *G06F 1/189* (2013.01); *H01R 31/065* (2013.01); *H02J 7/00* (2013.01);
(Continued)

(58) Field of Classification Search
CPC .. H02J 7/0042; H02J 7/00; H02J 7/007; H02J 7/00045; H02J 7/0047; H02J 7/02;
(Continued)

(56) References Cited

U.S. PATENT DOCUMENTS 5,900,684 A * 5/1999 Lam ..................... H01R 31/065
200/518
7,243,246 B2 * 7/2007 Allen ......................... G06F 1/26
713/300
(Continued)

FOREIGN PATENT DOCUMENTS

| CN | 103037565 A | * | 4/2013 | ......... H05B 37/0272 |
| CN | 204407628 U | | 6/2015 | |
| CN | 208097019 U | * | 11/2018 | ............... A61L 2/24 |

OTHER PUBLICATIONS

International Search Authority (ISA), "International Search Report," International Application No. PCT/US2019/60939, dated Feb. 4, 2020, 2 pages, publisher Commissioner for Patents—PCT, Alexandria, Virginia, United States of America.
(Continued)

*Primary Examiner* — M Baye Diao
(74) *Attorney, Agent, or Firm* — Fogarty LLP

(57) ABSTRACT

Systems and components are provided for charging an Information Handling System (IHS). Systems include an AC adapter configured to report attributes of the adapter. The adapter includes a DC cord that supports a data channel. The DC plug includes a circuit for operating an indicator light based on an control signal. The system includes a power port controller that receives the reported adapter attributes, determines a charging state of the IHS; generates the control signal based on the determined charging state; and transmits the control signal to the indictor light circuit via the data channel. The indicator control signal may be used to operate
(Continued)

indicator lights on both ends of a reversible DC cord. The indicator control signal may specify a color or brightness of the indicator and may indicate a charging state of the IHS.

18 Claims, 3 Drawing Sheets

(51) Int. Cl.
| | |
|---|---|
| *H01R 31/06* | (2006.01) |
| *H02J 7/02* | (2016.01) |
| *H02J 7/00* | (2006.01) |
| *H05B 45/00* | (2022.01) |

(52) U.S. Cl.
CPC ............ *H02J 7/007* (2013.01); *H02J 7/0042* (2013.01); *H02J 7/022* (2013.01); *H05B 45/00* (2020.01)

(58) Field of Classification Search
CPC ........ H02J 2207/20; G06F 1/26; G06F 1/189; G06F 1/263; H01R 31/065; H05B 45/00
See application file for complete search history.

(56) References Cited

U.S. PATENT DOCUMENTS

| | | | |
|---|---|---|---|
| 10,476,288 B2* | 11/2019 | Sultenfuss | ............ H02J 7/0068 |
| 10,531,530 B2* | 1/2020 | Yu | ........................ H02J 7/0029 |
| 10,996,276 B2* | 5/2021 | Sultenfuss | .............. G06F 1/263 |
| 11,251,645 B2* | 2/2022 | Sultenfuss | ................ G06F 1/26 |
| 2005/0138437 A1* | 6/2005 | Allen | ........................ G06F 1/26 |
| | | | 713/300 |
| 2005/0215110 A1* | 9/2005 | Chen | .................. H01R 13/7172 |
| | | | 439/502 |
| 2012/0212349 A1* | 8/2012 | Chang | ................ H01R 13/6691 |
| | | | 340/654 |
| 2013/0335010 A1 | 12/2013 | Wu et al. | |
| 2014/0210631 A1* | 7/2014 | Zavis | .................. G08B 21/185 |
| | | | 340/815.45 |
| 2016/0064978 A1* | 3/2016 | Lei | ..................... H02J 7/00036 |
| | | | 320/137 |
| 2017/0093095 A1 | 3/2017 | Chin et al. | |
| 2018/0375359 A1 | 12/2018 | Sultenfuss et al. | |
| 2019/0104586 A1 | 4/2019 | Yu et al. | |
| 2019/0372376 A1* | 12/2019 | Kwak | .................. H01R 31/065 |

OTHER PUBLICATIONS

International Search Authority (ISA), "Written Opinion of the International Searching Authority," International Application No. PCT/US2019/60939, dated Feb. 4, 2020, 6 pages, publisher Commissioner for Patents—PCT, Alexandria, Virginia, United States of America.

European Patent Office, "Extended European Search Report," Application No. 19911374.7, dated Nov. 16, 2022, 13 pages, publisher Munich, Germany.

* cited by examiner

INDICATOR FOR AC POWER ADAPTER

FIELD

This disclosure relates generally to Information Handling Systems (IHSs), and more specifically, to AC (Alternating Current) adapters for charging portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries. Power drawn from an electrical outlet may be used to charge the batteries of a portable IHS. Since the batteries of IHSs typically operate using DC (Direct Current) power, an AC adapter (i.e., AC/DC adapter or AC/CD converter) is required to convert the AC power from the wall outlet to DC power that can be used to charge the batteries. On one end, AC adapters include an AC plug that is inserted into the outlet. On the other end, AC adapters include a DC plug that includes a connector that is received by a power port of the portable IHS, where the power port is typically on a side or an edge of the IHS enclosure.

SUMMARY

In various embodiments, a system is provided for charging an Information Handling System (IHS). The system includes an AC (Alternating Current) adapter configured to report attributes of the AC adapter, wherein the AC adapter includes a DC cord that supports a data channel. The DC cord includes a first DC (Direct Current) plug including a DC connector that is received by a power port. The first DC plug includes a circuit for operating an indicator light of the first DC plug based on an indicator control signal. The system further includes a power port controller configured to: receive the reported AC adapter attributes; determine a state of the charging of the IHS by the AC adapter; generate the indicator control signal based on the determined charging state of the IHS; transmit the indictor control signal to the indictor light circuit via the data channel supported by the DC cord.

In additional system embodiments, the AC adapter attributes specify that the indicator light of the AC adapter is configurable by the power port controller. In additional system embodiments, the DC cord comprises a second DC plug that includes a circuit for operating an indicator light of the second DC plug based on the indicator control signal transmitted via the data channel. In additional system embodiments, the charging state of the IHS comprises a DC output voltage supplied to the IHS by the AC adapter. In additional system embodiments, the indicator control signal specifies a color of the indicator light. In additional system embodiments, the indicator control signal specifies a brightness of the indicator light. In additional system embodiments, the charging state of the IHS comprises a battery charge level of the IHS.

Various additional embodiments provide a power port controller for charging an Information Handling System (IHS). The power port controller includes a memory having program instructions stored thereon that, upon execution by a logic unit, cause the power port controller to: receive AC adapter attributes reported by an AC (Alternating Current) adapter comprising a DC (Direct Current) plug including a DC connector that is received by a power port of the IHS, wherein the DC plug comprises an indicator light; determine a state of the charging of the IHS by the AC adapter; generate an indicator control signal based on the determined charging state of the IHS; and transmit the indictor control signal to the indictor light.

In additional power port controller embodiments, the AC adapter attributes specify that the indicator light of the AC adapter is configurable by the power port controller. In additional power port controller embodiments, the AC adapter attributes are reported as PSID (power supply identification) information. In additional power port controller embodiments, the charging state of the IHS comprises a DC output voltage supplied to the IHS by the AC adapter. In additional power port controller embodiments, the indicator control signal specifies a color of the indicator light. In additional power port controller embodiments, the indicator control signal specifies a brightness of the indicator light. In additional power port controller embodiments, the charging state of the IHS comprises a battery charge level of the IHS.

In various additional embodiments, an AC (Alternating Current) adapter is provided for charging an Information Handling System (IHS). The AC adapter includes: a logic unit configured to report attributes of the AC adapter to a power port controller of the IHS, and a DC (Direct Current) plug including a DC connector that is received by a power port of the IHS, wherein the DC plug comprises an indicator light, and wherein the indicator light is configured based on an indicator control signal generated by the power port controller of the IHS, wherein the indicator control signal is based on a determined state of the charging of the IHS by the AC adapter.

In additional AC adapter embodiments, the AC adapter attributes specify that the indicator light is configurable by the power port controller. In additional AC adapter embodiments, the charging state of the IHS comprises a DC output voltage supplied to the IHS by the AC adapter. In additional AC adapter embodiments, the indicator control signal specifies a color of the indicator light. In additional AC adapter embodiments, the indicator control signal specifies a brightness of the indicator light. In additional AC adapter embodiments, the charging state of the IHS comprises a battery charge level of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
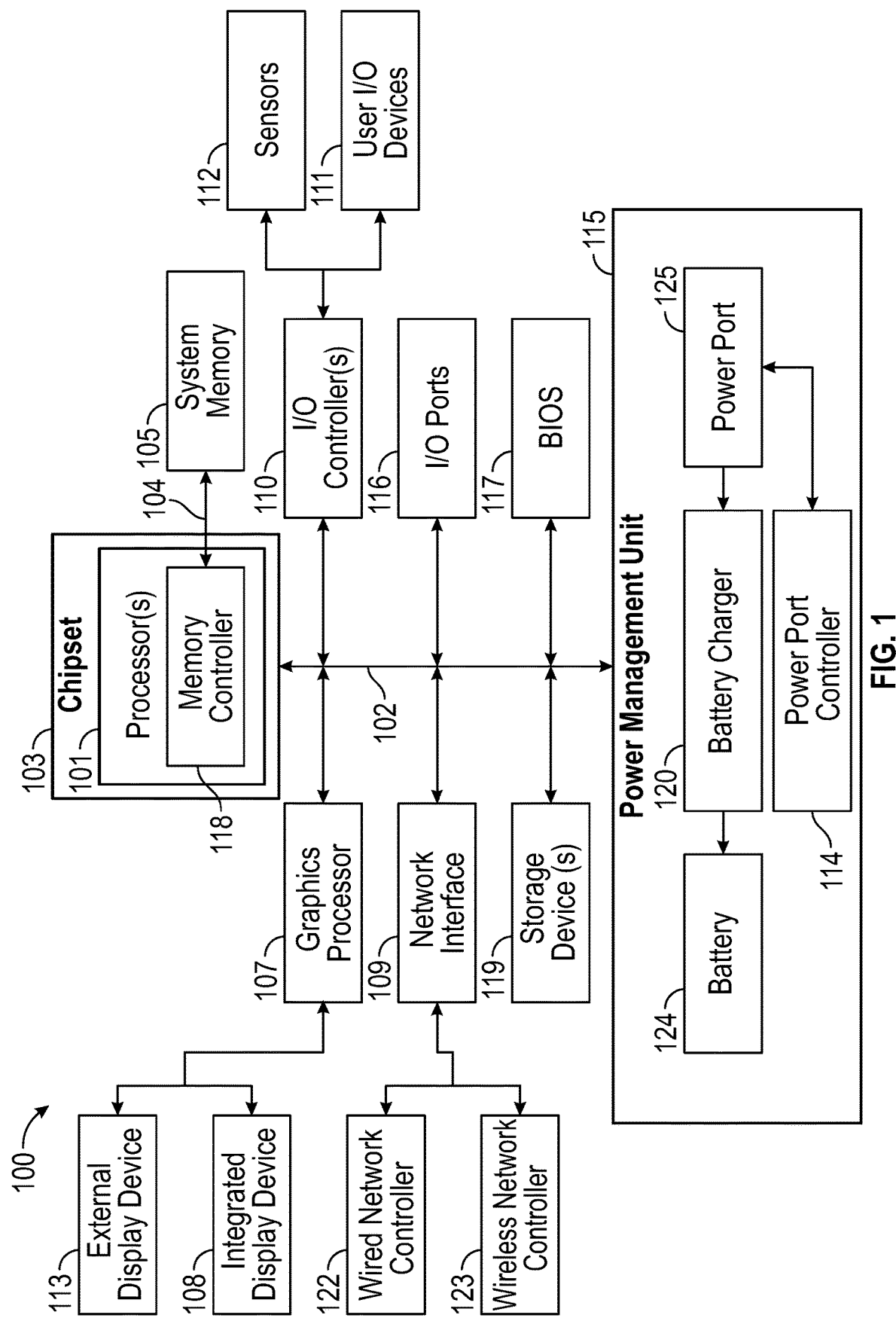
FIG. 1 is a block diagram depicting certain components of an IHS operable according to various embodiments for configuring an indicator light incorporated in an AC power adapter.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain portable IHSs may utilize AC adapters for providing power from an electrical outlet for use recharging internal batteries from which the portable IHSs operate. As IHSs become thinner, and thus more portable, it is preferable that the portion of the AC adapter that couples to the IHS also be as thin as possible. The adoption of thinner connectors, such as USB-C connectors that are considerably thinner than conventional USB connectors, will promote still thinner portable IHSs. Certain existing AC adapters may utilize indicator lights that are illuminated as long as the AC adapter is connected to a powered electrical outlet and regardless of whether the AC adapter is coupled to an IHS. Accordingly, in such existing AC adapters, indicator lights do not reflect whether the AC adapter is properly coupled to the IHS or whether the IHS is drawing power from the AC adapter.

FIG. 1 is a block diagram illustrating certain components of an IHS 100 configured according to certain embodiments for configuring indicator lights incorporated in an AC power adapter. In various embodiments, IHS 100 may include a power management unit 115 that includes logic that executes program instructions to perform certain of the operations disclosed herein for configuring indicator lights of an AC power adapter. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized in applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections.

In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

Other components of IHS 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, IHS 100 also includes a power management unit 115 that receives power inputs used for charging batteries 124 from which the IHS 100 operates. IHS 100 may include one or more power ports 125 to which an AC adapter may be coupled. As described, an AC adapter may draw AC from an electrical outlet and convert the AC to a DC output that is provided to an IHS via a DC connector. The DC connector portion of an AC adapter may be inserted into a compatible power port 125 of an IHS 100, thus providing the power to the IHS. The DC power input received at power port 125 may be utilized by a battery charger 120 for recharging one or more internal batteries 124 of IHS 100.

In certain embodiments, power management unit 115 of IHS 100 may include a power port controller 114 that is operable for configuring operations by power port 125. As described in additional detail regard to the below embodiments, power port controller 114 may be operable to configure one or more indicator lights comprised within an AC adapter that is coupled to a power port 125. As described in additional detail with regard to FIG. 4, in certain embodiments, power port controller 114 may configure indicator lights comprised within an AC adapter based on characteristics of the charging of IHS 100 by the AC adapter. In support of such operations, power port controller 114 may be operable to communicate charging information to a coupled AC adapter via a data channel supported by the power port 125 and a compatible connector utilized by the AC adapter. In certain embodiments, power port controller 114 may be a component of a system-on-chip from which the power management unit 115 operates. In certain embodiments, power port controller may an embedded controller that is a motherboard component of IHS 100, or a component of a power management unit 115 daughter card of IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
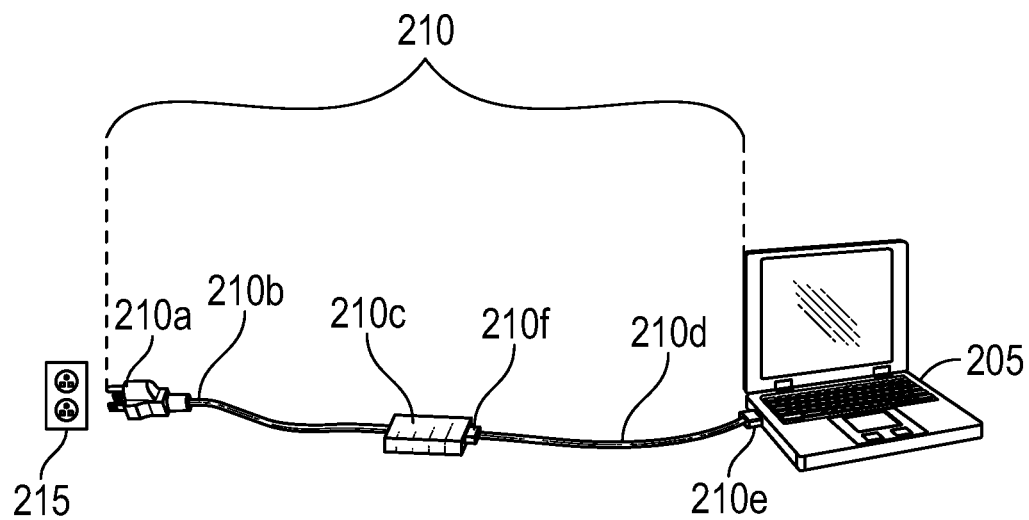
FIG. 2 is a diagram depicting certain components of charging system, according to various embodiments, that includes an AC adapter that is coupled to an IHS that is a laptop computer.

FIG. 2 is a diagram depicting components of charging system according to various embodiments, where that system includes an AC power adapter 210 coupled to an IHS that is a laptop computer 205. In the illustrated embodiment, AC power adapter 210 is used to charge the internal batteries of laptop computer 205. In other embodiments, AC power adapter 210 may be similarly used to charge the batteries of other types of portable IHSs, such as tablets, 2-1 convertible laptops, mobile phones and smart watches. Embodiments may be implemented using all varieties of IHSs that operate on DC power supplied by internal rechargeable batteries and that also utilize an AC converter that may be plugged into an electrical outlet 215 in order to charge the batteries of an IHS.

An AC power adapter 210 according to embodiments may include several connected components that operate to draw AC power from an electrical outlet 215 and convert the AC input power to a DC output for delivery to an IHS, such as the laptop 205 of FIG. 2. One end of the AC power adapter 210 includes an AC plug 210a that includes prongs that may be inserted into slots provided by an AC electrical outlet 215. Many different types of AC plugs 210a are utilized throughout the world, with different plugs from different regions utilizing different numbers, shapes and orientations of the prongs that conform to the electrical outlets used in a region. In North America, most general-purpose electrical outlets deliver 120 V of AC at a frequency of 60 hertz.

As illustrated, an AC electrical cord 210b of AC adapter 210 connects AC plug 210a to converter 210c. One function of converter 210c is to convert the AC received from power cord 210b to DC that can be used to power IHSs compatible with the AC adapter 210. In certain instances, converter 210c may be referred to as a power brick. The output generated by converter 210c may be DC within a voltage range that supports the power requirements of IHSs compatible for charging using AC adapter 210. As described in additional detail with regard to FIG. 4, converter 210c may also support identification of the AC adapter 210 to the coupled IHS, where this identification information may be utilized in configuring one or more indicator lights of the AC adapter. The DC output generated by converter 210c is provided to laptop 205 via a DC power cord 210d that supplies the DC output via a connector that is received by a power port of the laptop. In FIG. 2, the connector is enclosed within a DC plug 210e and is thus not visible. The DC plug 210e portion of AC power adapter 210 is described in additional detail with regard to FIGS. 3A and 3B.

In the illustrated embodiment, DC cord 210d also includes a DC plug 210f that may be received by a power port providing by converter 210c. Similar to DC plug 210e coupled to IHS 205, the DC plug 210f on the opposite end of DC cord 210d may be removed from the power port of converter 210c. In certain embodiments, DC plug 210e and DC plug 210f may be interchangeable for use in the power port of either converter 210c or IHS 205. In this manner, DC cord 210d may be reversible, such as a USB-C cable with USB-C connectors on each end. In such embodiments, both DC plug 210e and DC plug 210f may include indicators lights such as described in additional with regard to FIGS. 3A and 3B, where each of the DC plugs 210e and DC plug 210f are configured for illumination of indicator lights based on instructions from the power port controller of IHS 205. In certain non-illustrated embodiments, DC cord 210d may be fixed to converter 210c.

In certain embodiments, the configuration of the indictor lights on DC plugs 210e and 210f may be configured by the converter 210c instead of by the IHS 205. In such embodiments, converter 210c may include a power port and power port controller that operate in a similar manner as descried with regard to the power port 125 and power port controller 114 of the IHS 100 of FIG. 1 in order to illuminate indicators on both plugs 210e and 210f of DC cord 210d. However, rather than receive PSID information from another source, converter 210c may be the source of such PSID information and may utilize it directly. In the same manner as IHS 205, converter 210c may transmit configuration signals via the data channel of the DC cord 210d in order to configure indicator lights of DC plugs 210e and 210f on either end of the DC cord 210d.

Figure 3A:
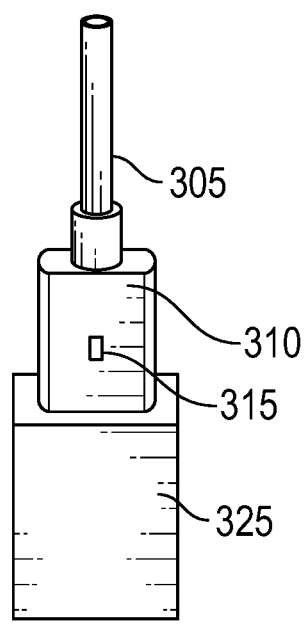
FIG. 3A is a diagram depicting certain components of a DC plug, according to various embodiments, of an AC power adapter, where the DC plug is received by a power port of an IHS.
Figure 3B:
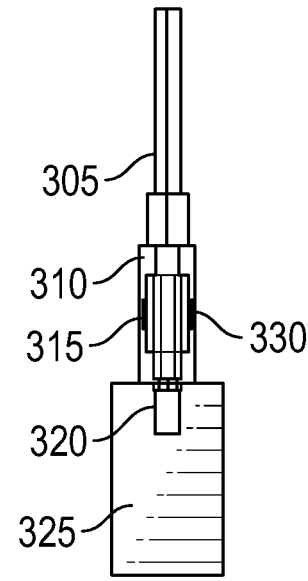
FIG. 3B is a diagram depicting a cutaway view of a DC plug according to various embodiments, such as the DC plug and IHS portion of FIG. 3A.

FIGS. 3A and 3B are diagrams depicting certain components of a DC plug 310, according to various embodiments, of an AC adapter, where the DC plug 310 includes a connector 320 that is received by a power port of an IHS 325. In certain embodiments, DC plug 310 may be connected to an identical DC plug on the other end of DC cord 305, thus providing a reversible cable. In certain embodiments, the power port controller of IHS 325 may transmit signals along a data channel supported by the DC cord in order to control the illumination of indicators incorporated in identical DC plugs on both ends of a DC cord. As described, in certain embodiments, instead of being included in IHS 325, a converter component of an AC adapter may instead include a power port controller or other logic to transmit illumination signals via the data channel of the DC cord in this same manner.

As illustrated in FIG. 3A, the DC plug 310 includes an indicator 315 that is visible to the user of the IHS 325 to which the AC adapter is coupled. In certain embodiments, indicator 315 may be a translucent portion of DC plug 310 that allows light from an LED (light-emitting diode), a mini-LED or a micro-LED included within DC plug 310 to be visible to the user. In certain embodiments, the LED that is visible via indicator 315 may be controlled via an LED driver circuit that is included within DC plug 310 and that regulates delivery of power to the LED. In such embodiments, the LED driver circuit may be configured to be operable directly based on command signals transmitted via the data channel of the DC power cord. In addition, the LED driver circuit may draw power directly from the DC power cord, either from the power circuit or from the data channel, in order to power the LED driver circuit. Accordingly, the LED driver circuit may be considered a parasitic component that draws power and operable command signals from the DC power cord.

Although not visible in FIG. 3A, certain DC plug 310 embodiments such as illustrated in FIG. 3B may include an additional indicator 330 located on the opposite side of the DC plug 310 from indicator 315. In certain embodiments where connector 320 and the power port of IHS 325 support reversible insertion of connector 320, DC plug 310 may be reversibly coupled at 180 degree orientations to the power port of IHS 325 such that either indicator 310 or indicator 330 remains visible to the user. In certain embodiments, the indicators 315 and 330 may support illumination of different colors. In certain embodiments, each of the indicators 315 and 330 may by illuminated using multiple, different-colored LEDs that may be illuminated separately or in combination. In other embodiments, each of the indicators 315 and 330 may be illuminated using LEDs that are capable of illuminating in multiple colors.

In the embodiments illustrated in FIGS. 3A and 3B, the DC plug 310 and connector 320 are representative of a USB-C type connector and plug. A USB-C connector includes pins that support various USB protocols for communication of data and for transfer of electrical power. In certain embodiments, selected data pins of a USB-C connector 320 may be used as a data channel to configure the indicator lights 315 and 330 within the DC plug 310 that encloses the USB-C connector 320, and in certain instances to similarly configure the indicators of a DC plug on the other end of DC cord 305. In addition, as described with regard to FIG. 4, an AC adapter may be configured to supply information specifying characteristics of the adapter to the IHS via a data channel supported by one or more of the data pins of a USB-C coupling.

Figure 4:
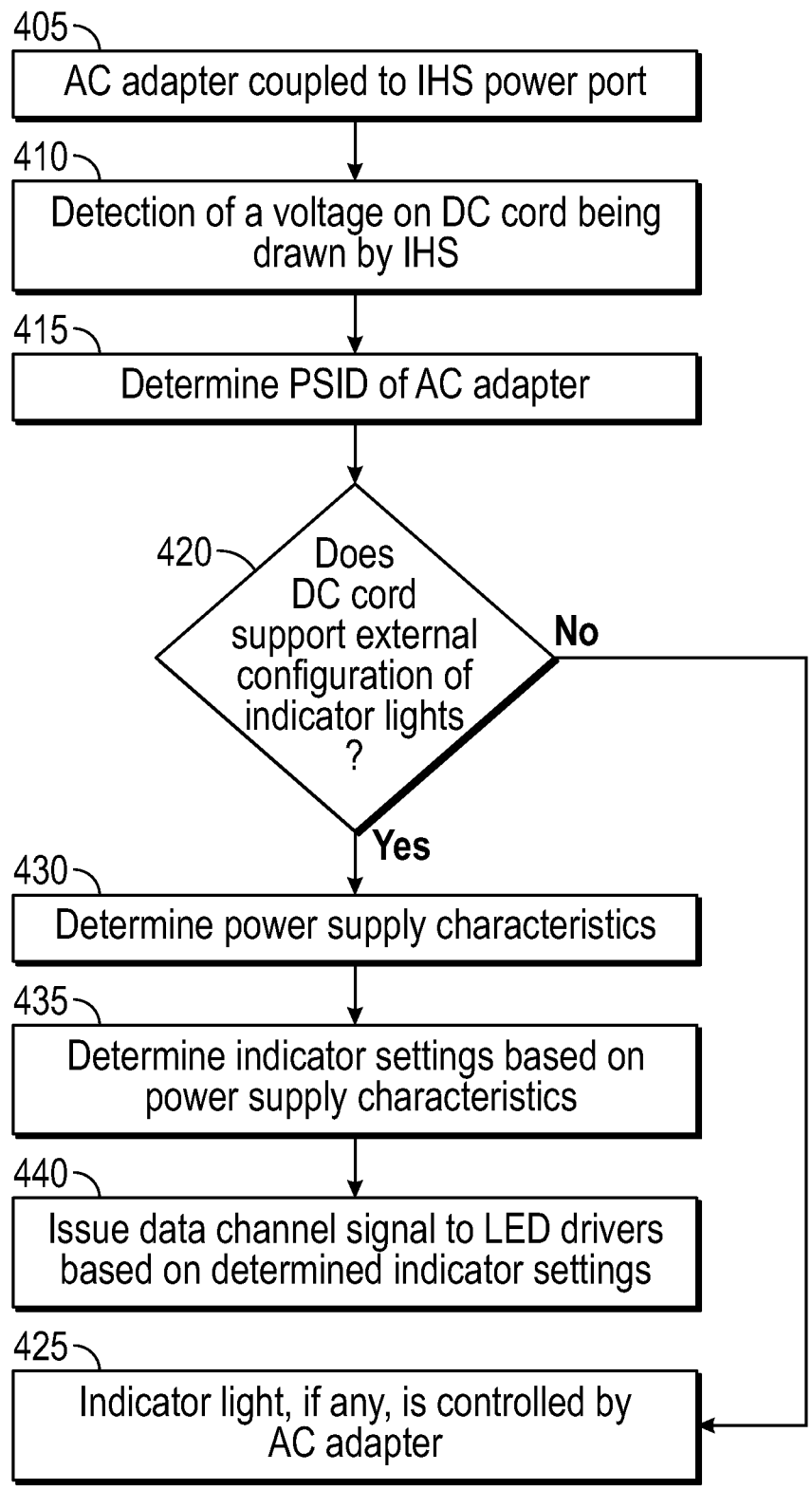
FIG. 4 is a flow chart diagram illustrating certain steps of a process according to various embodiments for an IHS power port controller to configure indicator lights of an AC power adapter coupled to the IHS.

As described in additional detail with regard to FIG. 4, the power port controller of an IHS that may be configured to utilize characteristics of the AC adapter and the charge provided by the AC adapter in order to select an illumination of indicators 315 and 330, and in certain instances, to also configure the indicators of a DC plug on the other end of DC cord 305. The illumination of indicators 315 and 330 based on charging characteristics determined by the power port controller may confirm that the output of the AC adapter is being used to charge the batteries of IHS, thus providing the user with confirmation that the AC adapter is properly coupled to the IHS. As described in additional detail below, additional charging status indications may be provided to the user via the illumination of indicators 315 and 330 by a power port controller of IHS 325.

In existing AC adapters, the illumination of an indicator may be controlled via a controller or other logic that is incorporated directly within the DC plug that includes the DC connector and the indicator light. In certain existing adapters, an indicator light controller included in the DC plug may be configured to capture, interpret and process PSID information in order to configure an indicator light included in the DC plug. Such controllers may be capable of configuring the indicators on one DC plug, but are incapable of configuring indicators of a DC plug on the other end of a DC cord. In such existing adapters, the housing must be large enough to accommodate a controller used for interpreting PSID information and configuring the indicator light. As described, portable IHSs that utilize AC power adapters are becoming increasingly thinner. In addition, the transition to lower profile power port and data port form factors, such as USB-C, will support further reductions in the thickness of IHSs. Accordingly, it is desirable for the DC plug 310 portion of AC adapters to remain as thin as possible, and at least as thin as the IHS to which the adapter is coupled. The inclusion of an indicator light controller or other such logic within the DC plug of existing AC adapters adds additional thickness to the DC plug. By controlling the indicator lights of an AC adapter via a power port controller operating within the IHS, or within the converter, embodiments allow for the thickness of the DC plug to be reduced. As reflected in the embodiment of FIG. 3B, the profile of DC plug 310 may be reduced to a thickness that is nominally greater than the connector 320 that is included within the DC plug 310.

In certain additional existing AC adapters, an indicator light included within a DC plug coupled to an IHS may be controlled via circuitry included within the converter (i.e., power brick) portion of the AC adapter. In such existing AC adapters, a wire is included within the DC power cord portion of adapter in order to relay indicator control signals from the converter to the DC plug coupled to the IHS. This additional wire included in such existing AC adapters thus adds additional thickness to the diameter of the DC power cord portion of the adapter. In addition, supporting reliable signaling via this wire embedded in a power cord requires shielding the wire, thus further increasing the diameter of the DC power cord. Accordingly, embodiments provide for control of the indicator lights of the AC adapter by a power port controller of IHS or of the converter, where the indicator lights are controlled using an existing data channel supported by the DC order, thus reducing the diameter of the DC cord present in certain existing AC adapters.

In the embodiments illustrated in FIGS. 3A and 3B, DC connector 310 is a multi-pin USB-C connector that may support two different orientations within the power port of the IHS. The two orientations of DC connector 320 are achieved by rotating DC plug 310 by 180 degrees. As illustrated in FIG. 3B, DC plug 310 may include an indicator 330 on the opposite face of the DC plug from indicator 315, thus allowing either indicator 315 or indicator 330 to remain visible to the user regardless of the orientation of the DC plug 310 relative to the power port. In other embodiments, the DC connector 320 may be a barrel type connector that enclosed within a cylindrical DC plug. In such barrel type connectors, power may be transferred via the barrel portion of the connector and a data channel may be supported via a center pin included within the barrel. In such barrel type connector, the indicator light may be visible via a translucent ring that circles a circumference of the cylindrical barrel DC plug. The center pin data channel extends the length of the DC cord to the DC plug on the other end such that indicators on barrel plugs on both ends of the DC cord may be controlled by the IHS in the same manner as described for USB-C plugs.

FIG. 4 is a flow chart illustrating steps of a process according to various embodiments for a component of an IHS, such as a power port controller, to configure one or more indicator lights of an AC power adapter coupled to the IHS. The illustrated embodiment begins at block 405 with the coupling of an AC adapter to a power port of an IHS. As described, an AC adapter includes a DC plug with a DC connector that is designed to mate with a power port of a particular type of IHS, and in certain reversible DC power cord scenarios, with a power port of a converter (i.e., power brick) of the AC adapter. Upon insertion of the DC connector into the power port of the IHS, at block 410, a voltage in the DC connector is detected by the IHS and/or by the converter. In certain embodiments, the converter portion of AC adapter may include circuitry that detects a voltage being drawn by IHS. In such embodiments, upon detecting such a voltage, the AC adapter may be configured to commence delivery of DC power to the IHS via the DC connector.

In response to detecting a supply of DC power from the AC adapter coupled to the power port of the IHS, at block 415, identification information for the AC adapter may be determined. In certain instances, AC adapters may be encoded with information identifying the type of adapter and certain characteristics of the adapter. In certain embodiments, the converter portion of the AC adapter may encode such information, including attributes such as the rating and manufacturer of the adapter. In certain embodiments, one such attribute may specify whether the AC adapter includes indicator lights that may be configured by the IHS. Based on such attributes, the power port controller may select an appropriate signaling protocol for directly configuring the operation of LED drivers via the data channel supported by the AC adapter.

In certain embodiments, the converter portion of the AC adapter may also include circuitry configured to read such encoded attributes and to generate a power supply identification (PSID) signal that may be transmitted on a data channel supported by the AC power adapter. As described, DC connectors utilized by AC adapters, including both USB-C and barrel type connectors, may include one or more data channels in addition to wires for transfer of power to an IHS. Upon an AC adapter initiating delivery of power to an IHS, in certain embodiments, the converter may be configured to generate a PSID signal and transmit the signal to the IHS via such data channels. In embodiments where the converter is capable of configuring the indicator lights, the converter may utilize this PSID information directly without any transmission of PSID information to the IHS.

Using the PSID information, at block 420, the power port controller of IHS or the converter determines whether the AC adapter supports external configuration of AC adapter indicator lights. In certain embodiments, PSID information generated by AC adapters indicates whether an AC adapter supports the recited configuration of indicator lights. If the PSID information of an AC adapter indicates that the recited configuration of indicator lights is not supported, at block 425, the indicator lights of the AC adapter may be controlled according to techniques supported by existing AC adapters, such as via circuitry included within the DC plug. In other scenarios, the PSID information may indicate that the AC adapter coupled to the power port is compatible for charging an IHS, but does not include any indicator lights.

If the coupled AC adapter is determined to support configuration of indicator lights by a coupled component, such as an IHS or a converter, at block 430, the power supply characteristics of the AC adapter may be determined. In certain embodiments, an AC adapter may support DC outputs at multiple voltage levels. For instance, an AC adapter may support 5 V, 9 V, 15 V or 20 V DC outputs. In such embodiments, the power port controller may determine the voltage level of the AC adapter output being drawn by the IHS. At block 435, such power supply characteristics may be utilized to determine settings for the indicator lights comprised within the DC plug of the AC adapter.

In certain embodiments, the detected voltage output of the AC adapter may be used to determine a brightness for the indicator lights. For instance, detection of a 5 V output by the AC adapter may result in the lowest brightness setting for the indicator lights. The detection of higher output voltages by the AC adapter results in increasingly brighter settings for the indicator lights, with the brightest indicator light setting being associated with the detection of the highest 20 V output of the AC adapter.

As described, in certain embodiments the indicator lights included within a DC plug may be illuminated in different colors. In such embodiments, different colors of indicator light outputs may be selected based on the detected output voltages of the AC adapter. For instance, the detection of a 5 V output by the AC adapter may result in a violet indicator light setting and a 20 V output of the AC adapter may result in a red indicator light setting. Other colors for indicator light settings may be selected for other output voltages in this manner.

As described with regard to FIG. 1, the DC output of an AC adapter may be received by an IHS via a power port and used to charge the internal batteries of the IHS. In certain embodiments, the selection of an indicator light setting may be based on the current charge levels of these internal batteries, as reported to the power port controller by the battery charger of the IHS power management unit. For instance, a low brightness indicator light setting may be selected during intervals where the battery charge level is below a bottom threshold. Increasingly higher brightness indicator light settings may be selected for increasingly higher battery charge levels, with the brightest indicator light setting indicating a full charge of the IHS battery. A range of different indicator light colors may be similarly selected to reflect different levels of charge in the IHS battery.

At block 440, the indicator light settings may be transmitted to the indicator lights housed within the DC plugs of an AC adapter. In certain embodiments, indicator light settings may be transmitted to the indicator lights via a data channel supported by the DC connector. In certain embodiments, the indicator light settings may be received by an LED driver that is configured to operate one or more LEDs corresponding to each indicator light supported by the DC plug based on the indicator light settings. In this manner, the indicator light settings may be selected in order to facilitate manipulation of the DC plug LEDs via the LED driver, while requiring minimal circuitry within the DC plug in order to support the LEDs. In certain embodiments, the LED driver settings may be transmitted in the form of signals that directly instruct the LED driver to operate the LEDs according to the specified brightness and/or color setting. For instance, at step 440, a signal may be transmitted on the data channel that signals a color to utilize in illuminating the indicators of the AC adapter. At a later time, a detected change in the voltage drawn using AC adapter may result in another data channel signals that configures the LED driver to switch to a different LED color. Similarly, data channel signals may provide commands directing LED driver to adjust the brightness of an LED.

In certain embodiments, the LED drivers in both DC plugs of a DC cord may be capable of configuring an LED based directly on such signals detected in the data channel, and without requiring logic to perform additional processing of such data channel signals. As described, the data channels supported by a DC cord may be utilized for transmitting various types of information between IHS and a converter of an AC adapter. In certain instances, the data signals used to configure a LED driver circuit may consist of signals that are not recognizable as valid signals by any other data channel listener except for the LED driver circuits. Accordingly, only LED driver circuits may be configured to detect data channel configuration signals, while all other data channel listeners drop or otherwise ignore such signals.

In this manner, the LEDs in the DC plug may be operated to provide the user with new types of information, while not adding thickness to the DC plug by which the AC adapter is coupled to the IHS and the converter. In addition, the LED driver circuits for DC plugs on both ends of a DC power cord may be configured using an existing data channel, and thus without requiring the use a dedicated wire in the DC power cord. As described, existing AC adapters may include indicator lights that reflect availability of power via the AC adapter. However, unlike the embodiments described herein, such existing AC adapters do not reflect whether the AC adapter is presently providing power to an IHS. In addition to providing such charging status information, the use of different indicator light colors and brightness levels may provide the user with additional information regarding the charging and/or power status of the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for charging an Information Handling System (IHS), the system comprising:
    an AC (Alternating Current) adapter configured to report attributes of the AC adapter, wherein the AC adapter includes a DC cord that supports a data channel, and wherein the DC cord comprises a first DC (Direct Current) plug including a DC connector that is received by a power port, wherein the first DC plug comprises a circuit for operating an indicator light of the first DC plug based on an indicator control signal; and
    a power port controller coupled to the power port, the power port controller configured to:
        receive the reported AC adapter attributes, wherein the AC attributes at least specify that the indicator light of the AC adapter is configurable by the power port controller;
        determine a state of the charging of the IHS by the AC adapter;
        generate the indicator control signal based on the determined charging state of the IHS; and
        transmit the indicator control signal to the indicator light circuit via the data channel supported by the DC cord.

2. The system of claim 1, wherein the DC cord comprises a second DC plug that includes a circuit for operating an indicator light of the second DC plug based on the indicator control signal transmitted via the data channel.

3. The system of claim 1, wherein the charging state of the IHS comprises a DC output voltage supplied to the IHS by the AC adapter.

4. The system of claim 1, wherein the indicator control signal specifies a color of the indicator light.

5. The system of claim 1, wherein the indicator control signal specifies a brightness of the indicator light.

6. The IHS of claim 1, wherein the charging state of the IHS comprises a battery charge level of the IHS.

7. The system of claim 1, wherein the AC adapter attributes further specify a rating and manufacturer of the AC adapter.

8. A power port controller for charging an Information Handling System (IHS), the power port controller comprising a memory having program instructions stored thereon that, upon execution by a logic unit, cause the power port controller to:
    receive AC adapter attributes reported by an AC (Alternating Current) adapter comprising a DC (Direct Current) plug including a DC connector that is received by a power port of the IHS, wherein the DC plug comprises an indicator light;
    determine a state of the charging of the IHS by the AC adapter, wherein the charging state of the IHS comprises a DC output voltage level supplied to the IHS by the AC adapter, and wherein the AC adapter supports more than one DC output voltage level;
    determine a brightness level of the indicator light based upon the DC output voltage level, wherein the brightness level is at a lowest setting if the DC output voltage level is below a first threshold, at a medium setting if the DC output voltage level is between the first threshold and a second threshold, or at a highest setting if the DC output voltage level is above the second threshold,
    generate an indicator control signal based at least in part on the determined charging state of the IHS, and the determined brightness level of the indicator light; and
    transmit the indicator control signal to the indicator light.

9. The power port controller of claim 8, wherein the AC adapter attributes specify that the indicator light of the AC adapter is configurable by the power port controller.

10. The power port controller of claim 8, wherein the AC adapter attributes are reported as PSID (power supply identification) information.

11. The power port controller of claim 8, wherein the indicator control signal specifies a color of the indicator light.

12. The power port controller of claim 8, wherein the indicator control signal specifies the determined brightness level of the indicator light.

13. The power port controller of claim 8, wherein the charging state of the IHS further comprises a battery charge level of the IHS.

14. An AC (Alternating Current) adapter for charging an Information Handling System (IHS), the AC adapter comprising:
- a DC (Direct Current) plug including a DC connector that is received by a power port of the IHS, wherein the DC plug comprises at least two indicator lights, wherein the at least two indicator lights may be illuminated independently; and
- a logic unit configured to report attributes of the AC adapter to a controller of the power port of the IHS, wherein the AC adapter attributes at least specify that the at least two indicator lights of the DC plug are configurable by the power port controller of the IHS; and wherein the at least two indicator lights of the DC plug are configured based on an indicator control signal generated by the power port controller of the IHS, wherein the indicator control signal is based at least in part on a determined state of the charging of the IHS by the AC adapter.

15. The AC adapter of claim 14, wherein the charging state of the IHS comprises a DC output voltage supplied to the IHS by the AC adapter.

16. The AC adapter of claim 14, wherein the indicator control signal specifies a color for each of the at least two indicator lights.

17. The AC adapter of claim 14, wherein the indicator control signal specifies a brightness for each of the at least two indicator lights.

18. The AC adapter of claim 14, wherein the charging state of the IHS comprises a battery charge level of the IHS.

* * * * *